United States Patent [19]
Meyer

[11] 3,784,004
[45] Jan. 8, 1974

[54] SKIN PACKAGING PROCESS AND SKIN PACKAGE THEREOF

[75] Inventor: Melvin H. Meyer, Maywood, Ill.

[73] Assignee: Stone Container Corporation, Chicago, Ill.

[22] Filed: Feb. 28, 1972

[21] Appl. No.: 229,776

[52] U.S. Cl............... 206/80 A, 53/30, 53/22 A
[51] Int. Cl..................... B65d 73/00, B65d 75/36
[58] Field of Search............ 206/80 A, 78 B, 56 A; 229/DIG. 12, 3.1, 48 T; 161/234, 235; 53/30, 22

[56] References Cited
UNITED STATES PATENTS

| 3,202,278 | 8/1965 | Taylor.............................. 206/80 A |
| 2,668,403 | 2/1954 | Rumsey, Jr..................... 229/DIG. 12 |
| 2,861,405 | 11/1958 | Hanford............................ 206/80 A |
| 2,876,899 | 3/1959 | Maynard, Jr...................... 206/80 A |
| 3,640,047 | 2/1972 | Brignall............................... 53/30 |

Primary Examiner—William T. Dixson, Jr.
Attorney—Silverman and Cass

[57] ABSTRACT

A method of making a skin package which comprises carding an article on a substrate of porous or air-permeable material having a meltable, thermoplastic barrier coating subtending the article which renders the substrate substantially impervious to passage of air or moisture therethrough; feeding the substrate with carded article to the vacuum forming station of a skin packaging machine concurrently with the feeding of said article-bearing substrate and a thermoplastic film below a heater assembly sufficiently to raise the temperature of the film above the melt temperature thereof and permit the radiant heat from the heater assembly and the film to raise the temperature of the barrier coating above its melt temperature with exception of that part of the barrier coating immediately subtending said article; said parts of the substrate which have melted barrier coating thereon being impregnated therewith and thereby being rendered pervious to air so as to permit a vacuum draw through the substrate for vacuum forming the softened plastic film around the article and laminating same to the substrate. The resulting skin package has an air impervious area immediately below the carded article provided by the unmelted coating which thereafter functions as a moisture vapor barrier for the film encased article.

13 Claims, 7 Drawing Figures

PATENTED JAN 8 1974 3,784,004
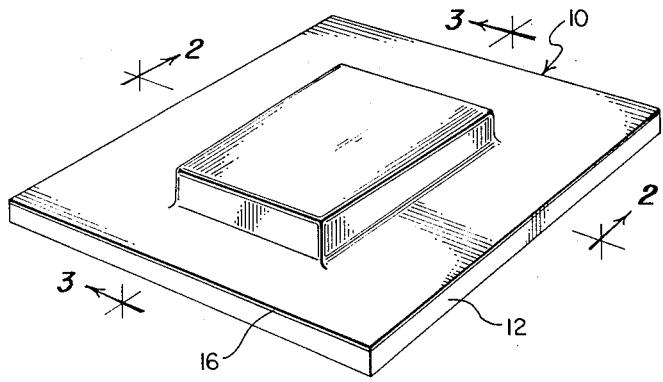
FIG. 1
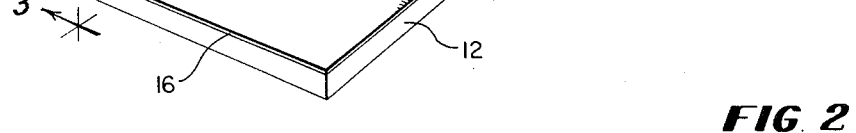
FIG. 2
FIG. 3
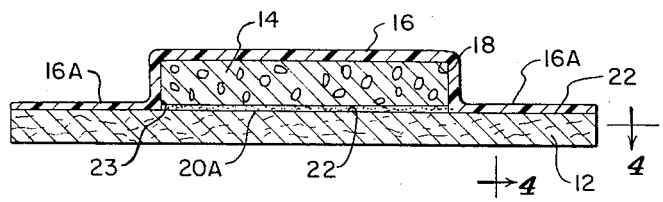
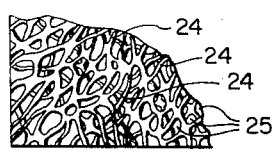
FIG. 5
FIG. 6
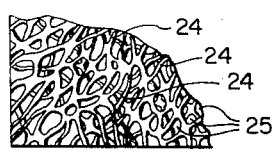
FIG. 4
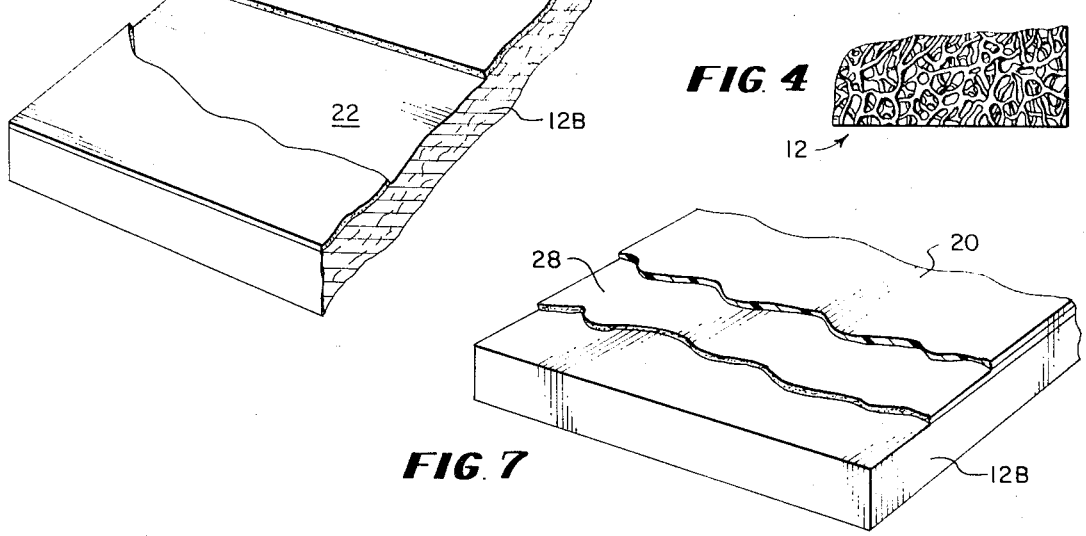
FIG. 7

SKIN PACKAGING PROCESS AND SKIN PACKAGE THEREOF

The invention also includes a skin package having a substrate supported vapor protection barrier coating for the encased article formed by means of the herein method, said coating serving to prevent entry and exit of moisture and air relative to the chamber in which the article is encased.

FIELD OF THE INVENTION

This invention relates to an improved method of making a skin package in which an article is supported on a porous or air-permeable substrate or base pad encased in a thermoplastic film laminated to the substrate, said substrate having a substrate supported vapor barrier protection coating substending the encased article to prevent entry of air or moisture through the substrate into the chamber in which the article is encased.

The invention also relates to a novel skin package having a substrate supported protective barrier across the mouth of the chamber in which the packaged article is encased and under the article, said barrier comprising a low temperature meltable thermoplastic coating which prevents passage of moisture and air into and out of the chamber through said substrate so as to substantially hermetically seal said article in the chamber.

DESCRIPTION OF THE PRIOR ART

A skin package of the general type with which the invention is concerned was relevant subject matter in U.S. Pat. No. 3,377,770 for Skin-Packaging Apparatus, U.S. Pat. No. 3,587,200 for Continuous Skin-Packaging Machine and Method and U.S. Pat. No. 3,507,383 for Skin Package. Such skin packages are to be distinguished from the so-called "bubble package" or "blister package" with which U.S. Pat. Nos. 3,342,320 or 3,104,759 are concerned, for the reasons discussed in said U.S. Pat. No. 3,507,383.

The skin-packaging art must also take note of F. A. Groth U.S. Pat. No. 2,855,735 for a Packaging Process wherein the adhesive-coated, ordinarily porous substrate was rendered air impervious or non-porous by the adhesive employed for laminating the film to the substrate. Thus, Groth U.S. Pat. No. 2,855,735 taught removal of a portion of the adhesive to provide a discontinuous or non-continuous adhesive coating to enable a vacuum to be drawn through the exposed porous substrate areas. Prior to U.S. Pat. No. 2,855,735, it was known to perforate the treated substrate in a particular adhesive pattern as taught by Wandelt U.S. Pat. No. 2,750,719. Further, it is known to apply continuously a coating of a synthetic resin conditioner to a paperboard substrate which immediately is surface-absorbed over the entire surface of the substrate and yet does not prevent vacuum-draw through the substrate.

In U.S. Pat. No. 3,507,383, problems attendant skin packaging of perishable foods was considered. To prevent deterioration of the packaged product, the exposed undersurface of the skin package was to be rendered non-porous or impervious to air. This patent taught use of a suitable sealing agent where the folded-over flanges did not abut on the underside of the package.

Other packages of interest are shown in K. F. Weinke U.S. Pat. No. 3,127,274, R. F. Hawkins U.S. Pat. No. 3,326,708, E. A. Shiner, et al. U.S. Pat. No. 3,378,379, James H. Grimm, et al. U.S. Pat. No. 3,403,048, W. T. Koch, et al. U.S. Pat. No. 3,459,117 and M. LeRoy Noyes, et al. U.S. Pat. No. 3,532,536.

None of these patents solve the problems encountered as enumerated hereafter. A continuous skin-packaging machine, such as taught by U.S. Pat. No. 3,587,200, was employed using conventionally treated paperboard substrate and plastic film, to produce skin packages carrying food. The skin packages were frozen and stored for at least one week, after which serious signs of dehydration, known as "freezer burn," occurred at the paperboard-meat product interface. When fresh meat was skin-packaged and thereafter frozen, blood and juices penetrated the paperboard and the meat adhered tightly to the substrate when the package was opened. Thus, heretofore conventional packaging techniques using the patented machine of U.S. Pat. No. 3,587,200 were less than satisfactory for preventing such undesirable dehydration results.

Similar undesirable results can be traced to skin packages for other than perishable food articles. For instance, it would be desirable to achieve prevention of moisture entry into the chamber having the encased article so as to prevent or minimize corrosion effects on the article or to prevent escape of moisture where bakery goods are packaged so as to eliminate staleness and dehydration of the goods.

SUMMARY OF THE INVENTION

The invention provides a novel method of producing skin packages which utilizes a low melting point barrier coating applied initially on one entire surface of a porous substrate material to render the substrate non-porous or impervious to a vacuum draw therethrough. An article is carded on the treated substrate and fed to the vacuum station of a skin packaging machine concurrent with the thermoplastic film. The substrate and film are subjected to the radiant heat from the heating assembly of the skin packaging machine sufficiently to raise the temperature of the film above the melting point thereof. Likewise, the temperature of the barrier coating is elevated sufficiently, including radiant heat effect of the heated film, to melt the same with exception of that part of the coating immediately below the article. The coating so melted is absorbed by the substrate and renders the absorbed parts of the substrate porous, thereby enabling a vacuum drawn at the vacuum station to drape the softened plastic film around the article and laminate same to the substrate. The portion of the substrate contacted by and below the article remains non-porous by reason of the unmelted coating forming a vapor protection barrier which prevents passage of air into the chamber having the article encased therein.

The invention also provides a method of continuously forming skin packages having a vapor protection barrier coating on the ordinarily porous substrate at the entrance to the chamber holding the encased article using a skin-packaging machine of the general character disclosed by U.S. Pat. No. 3,587,200. Ancillary thereto, the method of the invention contemplates forming such packages using skin packaging machines of non-continuously operating types, such as shown in U.S. Pat. No. 3,377,770.

The invention also provides a novel skin package having a barrier protection coating on the otherwise porous substrate subtending the article encased in a vacuum-formed plastic film chamber which prevents passage of air or moisture through the otherwise porous substrate subtending said article and relative to said chamber.

The invention also contemplates the use of certain primer coatings under the meltable, protective coating for improving final adhesion of the film to the substrate.

An improtant achievement of the invention is to provide a method of making a skin package especially suitable for food products and, as well, for certain metal products and parts desired to be packaged wiJh maximum corrosion protection.

The foregoing and other advantages of the inventions will become apparent from the ensuing disclosure in which a preferred embodiment of the invention is described in detail and illustrated in the accompanying drawings. It is contemplated that minor variations in structural features and arrangement of parts thereof may occur to the skilled artisan without departing from the spirit or sacrificing any of the advantages of the invention.

BRIEF DESCRIPTION OF THE DRAWINGS

FIG. 1 is a top perspective view of a skin package embodying the invention.

FIG. 2 is a sectional view taken through said skin package along the line 2—2 of FIG. 1 and in the direction indicated generally.

FIG. 3 is a sectional view taken through said skin package along the line 3—3 of FIG. 1 and in the direction indicated generally.

FIG. 4 is a fragmentary enlarged sectional view taken through the substrate along the line 4—4 of FIG. 3 and in the direction indicated generally.

FIG. 5 is a fragmentary enlarged plan view of the substrate illustrated in FIG. 4.

FIG. 6 is a fragmentary enlarged perspective view of the substrate having the barrier coating thereon with portions broken away to show details prior to melting of the coating.

FIG. 7 is an enlarged fragmentary perspective view of a modified form of substrate having a primer coating under the barrier coating and shown prior to melting of the barrier coating.

DESCRIPTION OF ILLUSTRATED EMBODIMENT

In FIG. 1, the skin package embodying the invention is designated generally by the reference character 10. To the extent that said package is conventional, the same includes a base pad or substrate 12, a packaged article 14 and a skinlike thermoplastic film 16 encasing the article supported on the substrate in a chamber 18. The film 16 is laminated to the substrate or base pad by means of a suitable conditioner or adhesive with which the base pad has been treated prior to forming of the film. The substrate ordinarily will consist of a thin-gauge sheet material of pervious or air-permeable nature, such as the conventional corrugated paperboard using fourdrinier kraft paper.

Referring to FIG. 6, there is shown a portion of substrate designated 12A which has been treated in accordance with the invention. The substrate 12A is in a condition prior to being exposed to heat in the skin packaging machine to which it will be fed. As shown, substrate 12A includes a carrier member 12B of conventional corrugated paperboard or other porous paperboard material having a coating or layer 20 covering the entire surface thereof. Said coating or layer 20 comprises a low temperature, meltable protection barrier coating selected from a material which will enable the desirable advantages of the invention to be realized. As shown in FIG. 6, the coating 20 is a solid film or very thin layer covering a surface 22 of the material 12B.

Refering to FIGS. 2 and 3, the article 14 is representative preferably of a food product, such as meat. The film 16 is illustrated stretched tightly across the upper surface 22 of the substrate material 12 and the article 14 to provide chamber 18 in which the article 14 is encased. Subtending the article 14 is a segment 20A of coating material, such as designated 20 in FIG. 6, said segment 20A of coating intended to illustrate closure of the mouth 23 to the chamber 18 in cooperation with the supporting substrate 12. However, it will be noted that the peripheral area 16A of the film 16 surrounding the chamber 18 is laminated directly to the substrate 12 and does not have interposed between itself and the substrate 12 a segment of coating material, such as segment 20A. The reason for this situation will be understood from an examination of FIG. 4.

In FIG. 4, it will be seen that the portions of the substrate 12 subtending the peripheral areas 16A of the film are porous. That is to say, during forming of package 10, the coating 20 which automatically would be layered on the upper surface 22, as seen in FIG. 6, has been melted and absorbed by the substrate in a manner rendering same porous so that a vacuum could be drawn therethrough by the vacuum-forming station of a skin packaging machine. That portion 20A of the coating 20 below or subtending the article 14 has not melted and therefore remains as a solid layer on the substrate 12. In this manner, the substrate having coating 20A remains non-porous and thereby hermetically seals the mouth 23 to chamber 18 with the article 14 therein.

FIG. 5 shows a portion of the substrate 12 which has the coating material 20 melted and absorbed therein. As illustrated in a greatly magnified vista, the interstices 24 between the fibers 25 of the substrate 12 permit air or moisture to pass therebetween. The melted coating covers the fibers 25 and acts as a conditioner agent for maintaining the film 16A laminated to the substrate surface 22, as seen in FIGS. 2 or 3.

In practicing the method of the invention, the substrate material 12B is coated with the protective barrier coating material 20 on an entire surface thereof. This may be the upper surface 22 considered in relation to the orientation of the packaged article 14 thereon or said coating 20 may be applied to the surface of the substrate 12B opposite to surface 22 with equal advantage. The coating 20 is a low temperature hot melt wax material or other suitable hot melt coating of synthetic plastic formulation. The coating material selected has the property of remaining solid at ordinary room temperatures so that it can function as a moisture-barrier protective coating on an otherwise porous substrate or base pad. Further, said coating material has a relatively low temperature melting point which is readily reached when the substrate 12A carrying an article 14 is fed through a skin packaging machine such as taught in U.S. Pat. No. 3,587,200 or U.S. Pat. No. 3,377,770.

Preferably, during the process of elevating the temperature of the film 18 to its melting point so that it can be vacuum formed, the radiant heat from the heat assembly of the skin packaging machine and the heat film is sufficient to melt the coating 20 on the substrate with the exception of that part or segment 20A thereof underneath or below the article 14 on the substrate. Apparently, the article 14 absorbes sufficient heat energy to prevent elevation of the temperature of the segment 20A to a point sufficient to melt same whereas the remaining coating material 20 surrounding the article 14 is caused to melt and impregnate the substrate 12. Thus, those portions of the substrate 12 which are impregnated by the melted coating 20 are rendered air permeable so that a vacuum draw is permeated through the substrate at the vacuum forming station of the machine. It will be appreciated that the substrate ordinarily is spaced a substantial distance from the heater assembly of a machine such as shown in U.S. Pat. No. 3,377,770 or U.S. Pat. No. 3,587,200.

Referring to FIG. 7, in order to achieve a stronger bond between the film 16 and the substrate 12 in a package 10, there may be interposed between the coating 20 and substrate 12B a layer or coating 28 of suitable adhesive which will be referred here as a "primer." Such a primer is made by E. I. Du Pont De Nemours & Company and sold under the trade designations "Surlyn D-1050," "Surlyn D-1052," "Surlyn D-1230," "Elvax D-1112" or "Elvax D-1263." Such primers improve adhesion of the film to the substrate and give fibre tearing bodns, if these are desired.

For purposes of this invention, the protective barrier coating can be described as a meltable, thermoplastic coating which, upon melting at a relatively low temperature, such as is likely to be encountered by the substrate skin package machines of the types referred to, will melt. Upon melting, it is readily absorbed by the paperboard substrate and provides a tight bond between the plastic film 16A and the paperboard. The unmelted coating, such as 20A, provides a good release to many products. When packaging metal products such as bearings, clutches, or various automobile or mechanical parts, the barrier coating 20A provides corrosion protection by preventing moisture entering the chamber 18. It is contemplated that corrosion-inhibiting products can be added to the chamber 18 to obtain a long-lasting anti-corrosion package. The barrier coating 20A in cooperation with the substrate 12 supporting same closes the mouth 23 to the chamber 18 to prevent moisture or air from entering the chamber. Thus, it is contemplated that specially formulated hot melt coatings and plastic films can be used to package bakery items, luncheon meats and/or bacon, which is very difficult to do in this skin packaging art.

The invention contemplates that a non-porous substrate might be used in practicing the invention by physically perforating the substrate, such as a boxboard, prior to hot melt coating thereof. This would allow such a substrate to be used. Obviously, using boxboard which has been perforated would be more expensive in the process.

Actual tests of the skin package embodying the invention using fourdrinier kraft substrates and hot metal wax coatings have enabled frozen meat or poultry to be skin packaged for four to six weeks without dehydration. This illustrates the effectiveness of the barrier coating embodying the invention on the substrate. Work has been done successfully with water-based coatings and so-called Surlyn and/or Elvax dispersions using the formulations of Du Pont products referred to above.

What I claim is:

1. A method of making a skin package comprising: coating the surface of a porous substrate sheet with a low-temperature meltable thermoplastic barrier coating material, carding an article on the substrate overlying said coating, feeding the substrate with carded article to a vacuum-forming station of a skin-packaging machine along with a thermoplastic film below the heater assembly of said machine heating said film so as to enable the radiant heat from the heater assembly to raise the temperature of the film above the melt temperature thereof and permit the radiant heat from the heater assembly and the film to raise the temperature of the barrier coating above its melt temperature with the exception of that part of the barrier coating immediately subtending said article, the melted barrier coating being absorbed by the substrate whereby to render the same pervious to air by effecting a protective barrier coating layer on the substrate which renders that part of the substrate having said layer impervious to air, laminating the thermoplastic film by vacuum draw through the air-pervious parts of the substrate to said substrate parts and encasing the article in a skin-like chamber which has the mouth thereof closed by said protective barrier layer to hermetically seal the article in said chamber.

2. A method as described in claim 1 in which said coating is applied to the surface of the substrate next adjacent the carded article.

3. The method described in claim 1 in which the coating is applied to the surface of the substrate opposite that surface next adjacent the carded article.

4. The method as described in claim 1 in which the substrate is heated only during lamination of said film.

5. The method as described in claim 1 in which the substrate is a continous sheet of material having said coating over an entire surface thereof and is fed to the skin-packaging machine continuously from a roll thereof.

6. A method described in claim 1 in which said substrate comprises a rectangular sheet of paperboard having said coating over one surface thereof and the coated substrate sheets are fed with carded articles thereon intermittently to a batch-type skin-packaging machine.

7. The method as described in claim 1 in which said coating comprises a hot-melt wax material.

8. The method as described in claim 1 in which there is a thermoplastic adhesive primer material interposed between the coating and substrate surface next adjacent the article thereon whereby to provide a stronger adhesive bond with the film laminated to the substrate.

9. A skin package comprising a normally porous substrate sheet, a meltable protection barrier coating supported over the entire surface of said substrate, an article carded on a surface of said substrate, a thermoplastic film formed over said article in skintight encasement therewith and having peripheral parts laminated to said surface of said substrate to provide a skin-like chamber for the article encased therein with a mouth portion of said chamber contiguous to said substrate, said meltable protection barrier closing off the mouth of said chamber to hermetically seal the article therein, the portion of said substrate not covered by said article having said coating melted and absorbed therein so as not to interfere with the normal porosity of said substrate, said substrate portion underlying said article having the coating unmelted thereat rendering said last mentioned substrate portion impervious to passage of air therethrough to form a vapor protection barrier for the article.

10. A skin package as described in claim 9 in which said coating material comprises a low temperature hot-melt wax.

11. A skin package as described in claim 9 in which said coating has been applied to the surface of the substrate next adjacent the surface supporting the article thereon.

12. A skin package as described in claim 9 in which said coating is applied to the surface of the substrate opposite the one having the article supported thereon.

13. A skin package as described in claim 11 in which there is an adhesive primer coating interposed between the first coating and the substrate for forming a stronger bond between the film and the substrate surface to which the film is laminated.

* * * * *